(12) United States Patent
Dugge

(10) Patent No.: US 7,446,765 B2
(45) Date of Patent: Nov. 4, 2008

(54) METHOD FOR GENERATION OF A THREE-DIMENSIONAL TERRAIN MODEL WITH THE ASSISTANCE OF OBJECT-ORIENTED VECTOR DATA

(75) Inventor: Peter Dugge, Oldenburg (DE)

(73) Assignee: Atlas Elektronik GmbH, Bremen (DE)

( * ) Notice: Subject to any disclaimer, the term of this patent is extended or adjusted under 35 U.S.C. 154(b) by 210 days.

(21) Appl. No.: 10/557,248

(22) PCT Filed: May 21, 2004

(86) PCT No.: PCT/EP2004/005464

§ 371 (c)(1),
(2), (4) Date: Nov. 16, 2005

(87) PCT Pub. No.: WO2004/109604

PCT Pub. Date: Dec. 16, 2004

(65) Prior Publication Data

US 2007/0024623 A1  Feb. 1, 2007

(30) Foreign Application Priority Data

Jun. 6, 2003  (DE) ................................ 103 25 738

(51) Int. Cl.
*G06T 17/00* (2006.01)

(52) U.S. Cl. ..................................................... 345/420
(58) Field of Classification Search ................ None
See application file for complete search history.

(56) References Cited

U.S. PATENT DOCUMENTS 5,798,768 A  8/1998  Cacas

OTHER PUBLICATIONS

Owen, S., Subsurface Characterization with Three-Dimensional Natural Neighbor Interpolation, 1993, Meshing Research Corner, pp. 1-22.*

* cited by examiner

*Primary Examiner*—Ulka Chauhan
*Assistant Examiner*—Said Broome
(74) *Attorney, Agent, or Firm*—Fitch, Even, Tabin & Flannery; Norman N. Kunitz

(57) ABSTRACT

A method for generating a three-dimensional terrain model while using object-oriented vector data that contain supporting points, which describe the terrain, of position values indicating at least the cartographic position, and of elevation values that indicate their height or depth with regard to a reference level. The aim of the invention is to obtain a stable method that automatically ensues without human interaction. To this end, the elevation values of the supporting points are extrapolated within a uniform grid, and all extrapolation values are subjected to a weighted interpolation.

12 Claims, 9 Drawing Sheets

METHOD FOR GENERATION OF A THREE-DIMENSIONAL TERRAIN MODEL WITH THE ASSISTANCE OF OBJECT-ORIENTED VECTOR DATA

CROSS REFERENCE TO RELATED APPLICATION

This application is the National Stage filing under 35 U.S.C. 371 of International Application No. PCT/EP2004/005464, filed May 21, 2004, and claims priority of German Patent Application Number 103 25 738.1, filed Jun. 6, 2003, which is incorporated herein, in its entirety, by reference.

BACKGROUND OF THE INVENTION

The invention relates to a method for generation of a three-dimensional terrain model with the assistance of object-oriented vector data, which contains position values which indicate at least the cartographic position of support points which describe the terrain and height values which indicate their height or depth with respect to a reference level.

Various methods are known for generation of three-dimensional terrain models for a 3D terrain representation and evaluation, and are all based on information in electronic form about the geographical area. Known forms of such information are grid data, object-oriented vector data and matrix data. Grid data contains pixel information in the form of a grid, object-oriented vector data contains information relating to object-specific characteristics such as the geological character of the seabed, and three-dimensional information relating to objects such as the geographical coordinates of a wreck, in a form distributed non-uniformly over the terrain in three dimensions, and matrix data contains, inter alia, information relating to terrain heights or depths in a form distributed regularly over the terrain.

This data is obtained by suitable surveying of the terrain surface or of the seabed, with the measurement points being chosen such that terrain shapes, such as summits, depressions, ridges, valleys, fault lines, contour gradients and particular objects such as roads, waterways and buildings are optimally recorded. In addition, object types and characteristics are also recorded. Terrain models are generated from data such as this using known methods as a largely automatic, interactive process with human monitoring, also including quality control of the measurement data. In this case, either regular models are produced, in which support points which are predetermined by the data are distributed uniformly (matrix data) and further model points are generated by interpolation in the grid, or irregular models are produced, in which the support points are distributed non-uniformly and further model information is produced, for example by triangular networking according to Delauny (Bartelme, Geoinformatik [Geoinformation], Springer, Berlin 1995, page 117 et seq.)

In tactical systems, in which extensive terrain analyses are carried out, regular terrain models are generally used, which are supplied externally to these systems. If representations relating to the topography (road course, position of towns, etc.) are also intended to be provided on these systems, maps in the form of grid-oriented or object-oriented electronic maps must also be incorporated in the system, in addition to the terrain model, for this purpose.

SUMMARY OF THE INVENTION

The invention is based on the object of specifying a method for generation of a three-dimensional terrain model, which allows automatic generation of the terrain model from object-oriented, electronic vector data without any human interaction.

The above object generally is achieved according to the invention by a method for generation of a three-dimensional terrain model with the assistance of object-oriented vector data, which contains position values which indicate at least the cartographic position of support points that describe the terrain and height values that indicate their height or depth with respect to a reference level, and wherein the height values of the support points are extrapolated, and the extrapolation values are subject to weighted interpolation.

The method according to the invention has the advantage that it is very stable as a result of the combination of extrapolation and weighted interpolation, that is to say it leads to sensible results without any human interaction using only object-oriented vector maps which have been created in the form of a plan view, taking into account the visualization of height information. This also applies to phenomena such as displacement, interruption and termination of contour lines, a highly fluctuating point density, entwined contour lines which occur quite frequently in the case of maps designed for visualization in the form of a plan view (2D representation) and do not occur here. So-called terrace formations which result with other methods are likewise avoided.

The terrain model can be created from object-oriented vector maps directly in a tactical application and can be used together with these maps, so that the terrain model—in contrast to the situation with the prior art—need not be supplied externally to the tactical application. This results in advantages such as reduced supply complexity for the provision of geographical data for the tactical application, reduced maintenance effort with geographical information being included in the tactical application, and increased consistency between the terrain model and evaluations and object-oriented vector data derived from it, as well as representations derived from this in the tactical application. The latter leads to clearer results in the three-dimensional evaluation and representation of information relating to the geographical area.

The method according to the invention allows regular height and depth fields, map representations with height levels, map representations with shading, visibility areas in the terrain for optical and other electromagnetic radiation, terrain sections and oblique views of the terrain can be produced from object-oriented vector maps with very good results, and allows the following tactical applications to be supported: ground navigation, route planning, drone planning, visibility analyses for radar, plausibility checks for ESM data, threat analysis for air attacks from concealed valleys, propagation calculations for sonar signals, trajectory planning for torpedoes, route planning for submarines, and mission planning for operational vehicles.

Expedient embodiments of the method according to the invention together with advantageous developments and refinements of the invention can be found in the other claims.

According to one advantageous embodiment of the invention, the height values of the support points are written to grid fields of a regular grid as support values associated with the cartographic position of the support points and the extrapolation of the support values and the subsequent weighted interpolation of the extrapolation values are carried out in the grid.

According to one advantageous procedure, the grid is run through in rows and columns, grid field by grid field, for extrapolation and, in the first run in this case, each support value which is stored in a grid field is written as an extrapolation value to an unoccupied grid field which is adjacent in the direction of the run. In all the other runs, each support value which is stored in a grid field and each extrapolation value derived therefrom is written to an unoccupied grid field which is adjacent in the direction of the run. All the extrapolation values are allocated a distance figure, which indicates the proximity of the extrapolation value to its support value. The runs through the grid are repeated in a predetermined sequence until all of the grid fields which were unoccupied at the start time are occupied with extrapolation values.

According to a further refinement of the invention, the interpolation is preferably carried out in such a way that the grid is run through in rows and columns once again, grid field by grid field, and, in the process, weighted interpolation is carried out between two height values which are immediately adjacent to one another in the direction of the run, have a height difference not equal to zero and of which at least the height value which follows in the direction of the run is an extrapolation value, and this extrapolation value is overwritten with the interpolation value. The runs are repeated in the predetermined sequence until there are no more extrapolation values in the grid whose height details have a height difference other than zero from an adjacent height value which may be a support value or an interpolation value.

The runs in rows and columns through the grid field during the extrapolation and interpolation processes can be carried out as required, with a sequence, once it has been selected, being retained unchanged for further run cycles. For example, one run cycle may comprise a run row-by-row from left to right, a subsequent run row-by-row from right to left, a run from top to bottom and a run from bottom to top. The stated sequence of the runs in a run cycle can be interchanged as required, but, once the sequence has been selected, it is, retained in the subsequent run cycles.

BRIEF DESCRIPTION OF THE DRAWINGS

The invention will be described in more detail in the following text with reference to one exemplary embodiment of the method, which is illustrated in the drawing, in which.

DETAILED DESCRIPTION OF THE INVENTION

Figure 1:
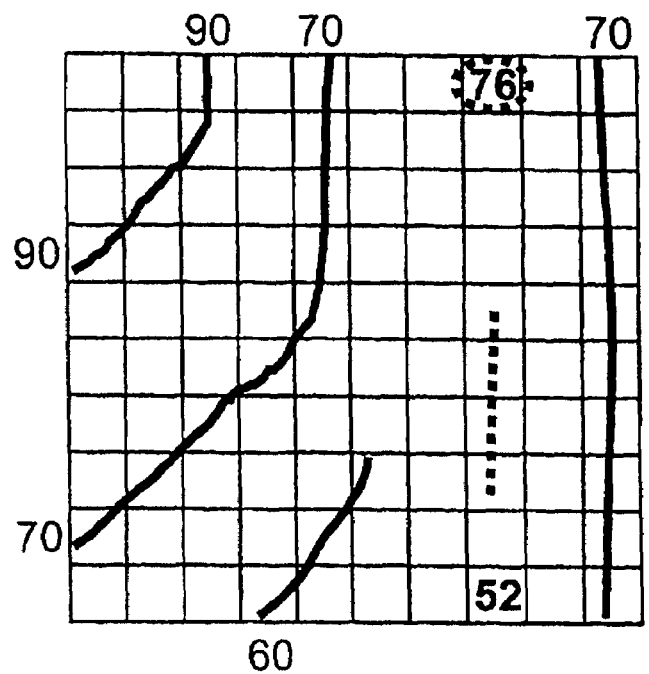
FIG. 1 shows elements from an object-oriented vector map in comparison to their position with respect to a regular grid.

The method illustrated in the drawing on the basis of a chosen example for a terrain detail generates a three-dimensional terrain model on the basis of object-oriented vector maps, which have been produced paying major attention to the visualization of height and depth information in a plan view. Object-oriented vector maps such as these are available in electronic form. The following text refers only to height values and height details, with depth values and depth details being considered as negative height values and height details. Terrain models such as these are used for three-dimensional evaluation and representation of the object-oriented vector maps used to produce them. The method creates the terrain models completely automatically without any human interaction, in which case the creation process can be carried out directly in a tactical application. Tactical applications such as these are, for example, ground navigation, route planning, drone operational planning, mission planning for operational vehicles with navigation and the like, trajectory planning for torpedo firing, mission planning for submarines, and threat analyses for air attacks, etc.

FIG. 1 illustrates a terrain detail from an object-oriented vector map which contains objects and elements with height details in the correct position. Examples are contour lines with the height details "90", "70", "60". "52" represents a surveyed height, for example a summit, the "76" with a dotted outline is a so-called discontinuity with the height "76", and the dotted line represents a relatively long fault line without any height details. A discontinuity with height details may, for example, be a tower, a fault line without any height details, for example a river, a dam or the like.

Figure 2:
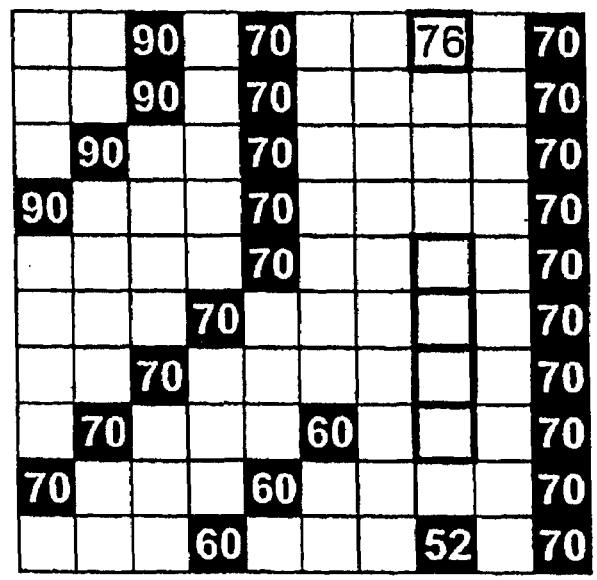
FIG. 2 shows a regular grid with the recorded elements from the object-oriented vector map shown in FIG. 1.

The procedure for creation of a terrain model using these support points which are not distributed uniformly in the terrain, which terrain model is compatible with three-dimensional evaluation and representation of the terrain detail is carried out as follows:

The irregularly distributed support points which are available from the object-oriented vector map for the chosen terrain section and have height details are transferred in the correct position to a uniform grid. In FIG. 1, this grid is placed on the terrain section exclusively to illustrate the position of the objects and elements. The height details of the support points are written in the grid fields of the grid in the correct positions as support values. In FIG. 2, the grid fields which are occupied with support values (height values of the support points) are identified by blackening and the height details "90", "70", "60", "52". Fault points and fault lines are symbolized by black outlines around the associated grid fields. The height indication "76" is written in the grid field for the fracture point with a height indication.

All the height values of the support points, or support values for short, in this grid that has been filled in this way are extrapolated, and all of the extrapolations are then subjected to weighted interpolation. The grid fields which are occupied by the fault points with and without height details are first of all excluded from this process.

The extrapolation process is fundamentally carried out in such a way that the grid is passed through in rows and columns, grid field by grid field, and, in the first run in this case, each support value which is stored in a grid field is written in the first run as an extrapolation value in an adjacent grid field in the direction of the run, if this grid field is unoccupied, and each support value which is stored in a grid field and each extrapolation value derived from it is written in a grid field which is adjacent in the direction of the run, if it is unoccupied, in all the further runs. All the extrapolation values are allocated a distance figure which indicates the proximity of the extrapolation value to its support value. The runs are repeated until all of the grid fields which were unoccupied at the start of the extrapolation process are occupied with extrapolation values.

Figures 1, 3:
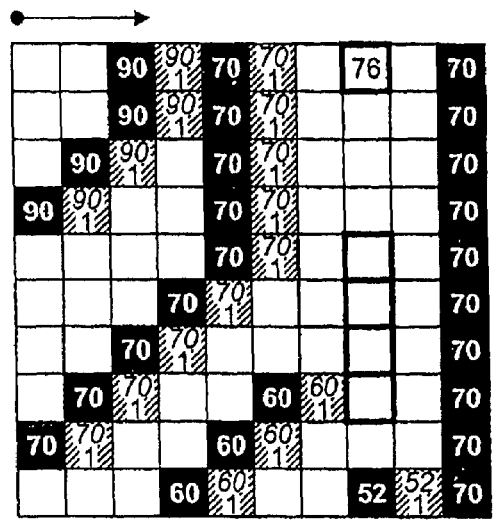
FIG. 3 shows an illustration of the procedure for extrapolation in a grid over six runs through the grid (FIGS. 3-1 to 3-6)
Figures 2, 3:
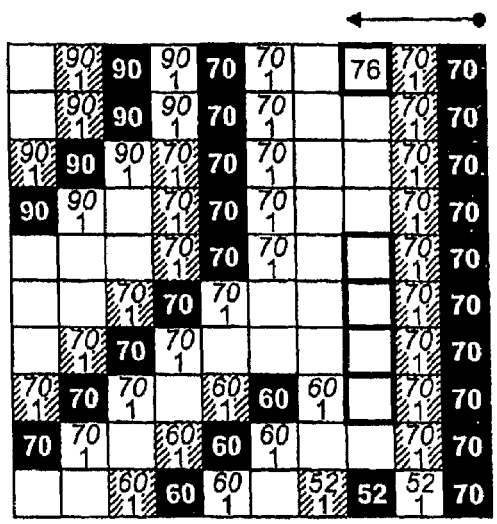
Figure 3:
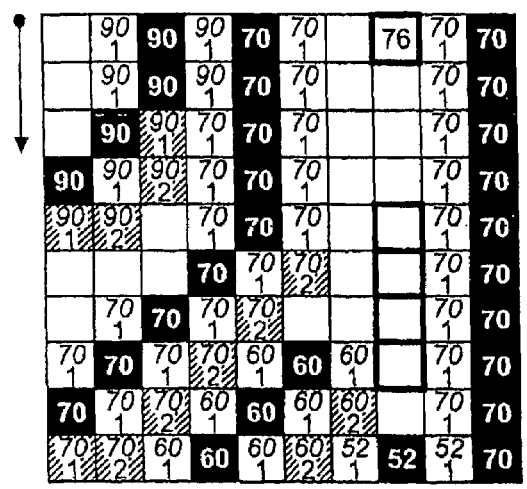

FIG. 3 shows the extrapolation process in detail, in which case a total of six runs through the rows and columns are required in order to fill all of the grid fields with extrapolation values. The direction of the individual runs is indicated by arrows on the grid in FIG. 3. A first row-by-row run through the grid is carried out from left to right, as shown in FIG. 3-1, row-by-row, until the entire grid has been covered. The extrapolation values derived from the support values are provided with the same height details and additionally the distance figure, which is indicated by "1", because the extrapolation value is derived directly from the support value, that is to say it is closest to it. The grid fields which are occupied with the extrapolation values produced in this way are illustrated in a shaded form in the grid in FIG. 3-1. After the run as shown in FIG. 3-1, all the grid fields which are located to the right of a support value and are immediately adjacent to it are filled with an extrapolation value.

The next run is carried out row-by-row from right to left, as is indicated in FIG. 3-2. The extrapolation rule that has been described now results in all of those grid fields which are located to the left of the support values and are directly adjacent to the support values, and which are still unoccupied, being filled with the extrapolation values derived from the support values. Once again, they are provided with the same height details as the support values and in addition with the distance figure "1", since they are derived directly from the support values. In FIG. 3-2, the grid fields which had been filled with extrapolation values during this run are identified by shading.

In the third run, which is illustrated in FIG. 3-3, the grid is run through in columns, column by column, from top to bottom. In the process, not only are extrapolation values derived from support values but also from already existing extrapolation values. The extrapolation values which are derived from extrapolation values are provided with a distance figure which is "1" greater than the distance figure of that extrapolation value from which the newly created extrapolation value is derived. For example, during this column-by-column run in FIG. 3-3, the extrapolation value "90" (shaded), to which the distance figure "1" is allocated, is derived from the support value "90" in the first column. During the column-by-column run from top to bottom in the second column, a new extrapolation value "90" with the distance figure "2" (shaded) is derived from the extrapolation value "90" with the distance figure "1".

Figures 3, 4:
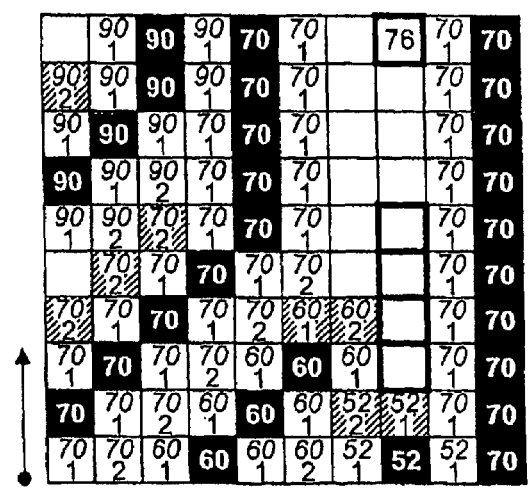
FIG. 4 shows an illustration of the procedure of weighted interpolation over twenty-four runs through the grid (FIG. 4-1 to 4-24)

The next run is once again carried out column-by-column but this time from bottom to top (FIG. 3-4). The extrapolation values which are newly created during this run and are once again written in those grid fields which are still empty but are directly adjacent in the direction of the run can once again be identified by shaded grid fields in FIG. 3-4.

Figures 4, 5, 6, 7, 8, 9, 10, 11:
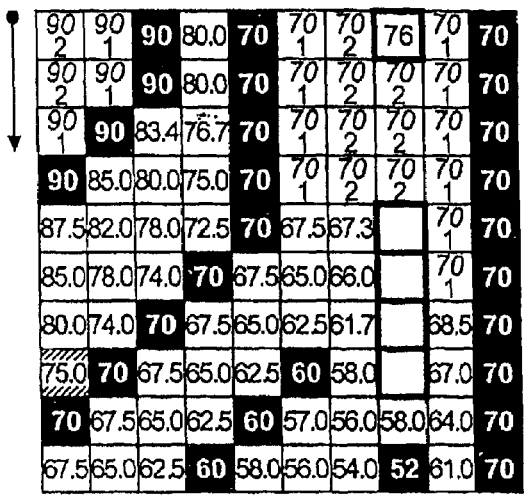
FIG. 5 shows an illustration of the procedure for extrapolation of so-called fault lines.
Figures 4, 5, 6, 7, 8, 9, 10, 11, 12:
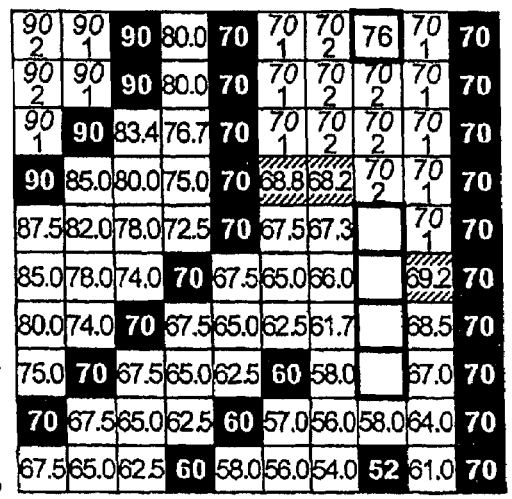
Figures 4, 5, 6, 7, 8, 9, 10, 11, 12, 13:
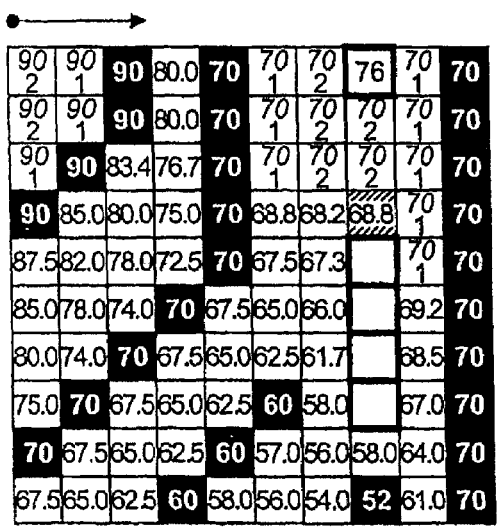
Figures 4, 5, 6, 7, 8, 9, 10, 11, 12, 13, 14:
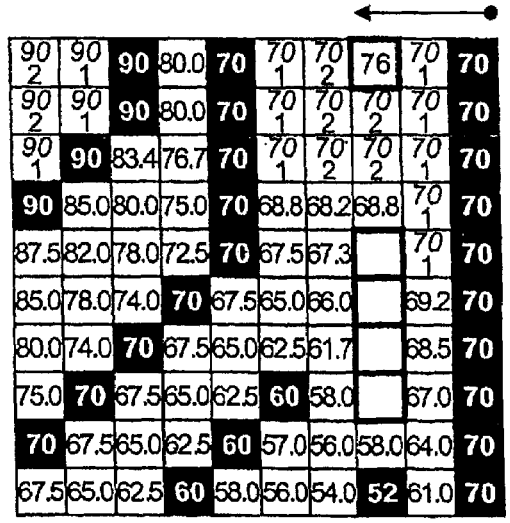
Figures 4, 5, 6, 7, 8, 9, 10, 11, 12, 13, 14, 15, 16, 17, 18, 19:
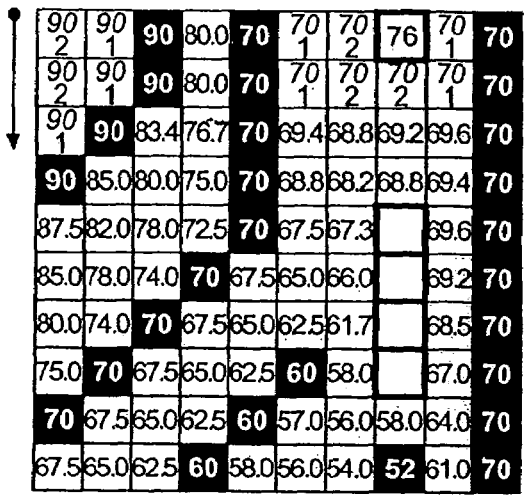
Figures 4, 5, 6, 7, 8, 9, 10, 11, 12, 13, 14, 15, 16, 17, 18, 19, 20:
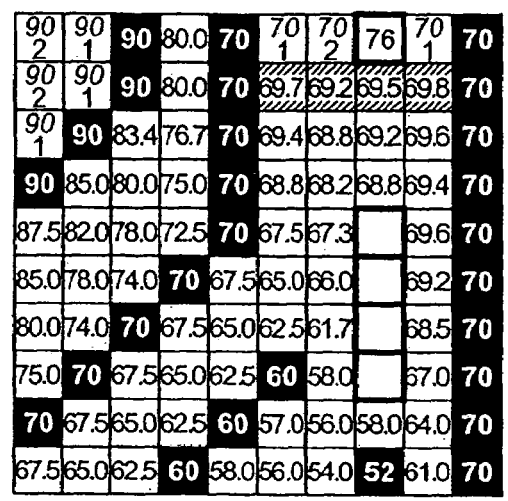
Figures 4, 5, 6, 7, 8, 9, 10, 11, 12, 13, 14, 15, 16, 17, 18, 19, 20, 21:
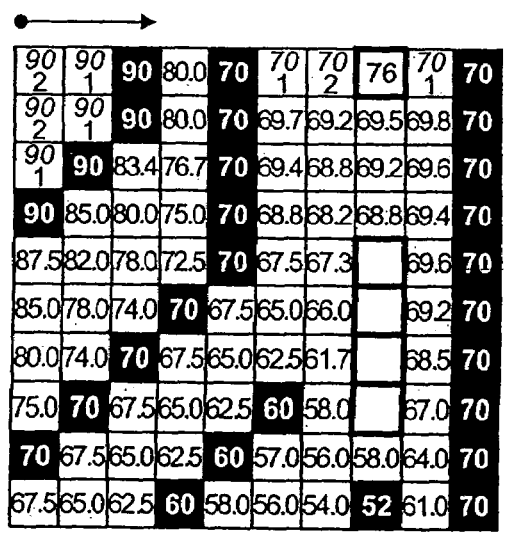
Figures 4, 5, 6, 7, 8, 9, 10, 11, 12, 13, 14, 15, 16, 17, 18, 19, 20, 21, 22:
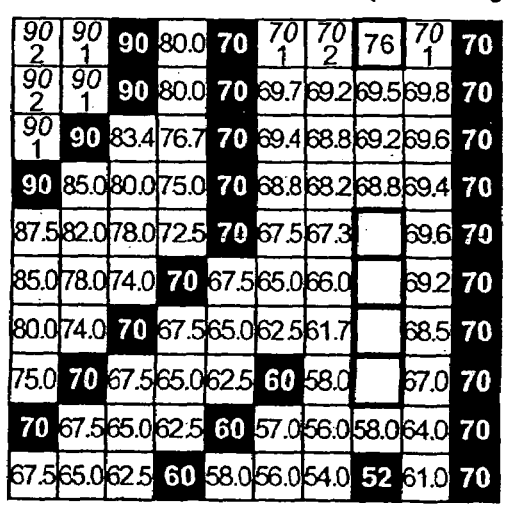

A further run is now carried out, this time once again row-by-row from left to right as shown in FIG. 3-5, with the grid fields that have been filled with the newly created extrapolation values likewise being shaded.

The next run is once again carried out row-by-row, from right to left. This run results in the grid fields shaded in FIG. 3-6 with the corresponding extrapolation values. After this run, all of the grid fields have been filled, as shown in FIG. 3-6, and the extrapolation process is thus ended.

It is not essential to comply with the sequence of the row and column runs through the grid as shown in FIG. 3. Thus, for example, a row-by-row run from right to left or a column-by-column run from top to bottom, or vice versa, can also be carried out first. The only important factor is that a different run is in each case chosen successively and an identical run is not carried out in succession, and that, once a sequence of runs has been chosen, it is maintained in all the cycles.

All of the extrapolation values contained in the grid are now subjected to a weighted linear interpolation process, with the distance figures of the extrapolation values being used to weight the interpolation. The generic term "height values" is used in the following text for support values, extrapolation values and interpolation values.

During the interpolation process as well, the grid is run through in rows and columns, grid field by grid field. In this case as well, the sequence of the runs can be varied during this process and all that is required is that, once a sequence of runs has been chosen, this is to be maintained until the end of the interpolation process. In the case of the interpolation process illustrated in the individual runs in FIG. 4, the same sequence of the runs is maintained as for the extrapolation process. Each run cycle comprises a row-by-row run from left to right (FIG. 4-1) and a row-by-row run from right to left (FIG. 4-2), as well as a column-by-column run from top to bottom (FIG. 4-3) and a column-by-column run from bottom to top (FIG. 4-4). This run cycle is repeated as many times as are necessary to complete the interpolation process.

During each run, a weighted linear interpolation process is carried out between two height values which are immediately adjacent to one another in the direction of the run, have a height difference not equal to zero, and of which at least the next height value in the direction of the run is an extrapolation value, with the latter being overwritten with the interpolation value. The interpolation value, $H_i$ is calculated using:

$$H_i = H_1 + \frac{H_2 - H_1}{D_1 + D_2 + 1} \cdot (D_1 + 1), \quad (1)$$

where $H_1$ is the first height value in the direction of the run, which may be a support value, an extrapolation value or an interpolation value, $D_1$ is its distance figure and $H_2$ is the next height value in the direction of the run, which must always be an extrapolation value, and $D_2$ is its distance figure. Each height value which is a support value or an interpolation value is assigned the distance figure "0" in the calculation based on equation (1). The row and column runs through the grid are carried out in accordance with the run cycle illustrated in FIGS. 4-1 to 4-4. The run directions are identified by the arrows illustrated on the grids. The interpolation values which are calculated in the respective run and are overwritten are marked by shaded grid fields.

By way of example, the following text explains the calculation of the interpolation value "76.7", which is created in the first run as shown in FIG. 4-1 and is written in the grid field in the third row and the fourth column. As can be seen from the grid in FIG. 3-6, this grid field is filled with the extrapolation value "70", and with the assigned distance figure "1", after the end of the extrapolation process. On the basis of the above statements, the interpolation between this extrapolation value and the previous extrapolation value "90" with the distance figure "1" takes place during the row-by-row run as indicated by the arrow in FIG. 4-1. Thus, in equation (1), $H_1=90$, $H_2=70$, $D_1=1$ and $D_2=1$. The equation (1) thus becomes:

$$H_i = 90 + \frac{70 - 90}{1 + 1 + 1} \cdot (1 + 1) = 76.7.$$

The extrapolation value $H_2=70$, which is involved in the interpolation process and, in the direction of the run, immediately follows the other extrapolation value $H_1=90$ used for interpolation is now overwritten with this interpolation value $H_i=76.7$. The overwritten grid field with the interpolation value "76.7" is illustrated shaded in FIG. 4-1.

If the first run cycle has been completed and there are still extrapolation values in the grid which have not yet been overwritten with interpolation values and which have a height difference with respect to the immediately preceding height value in the direction of the run that is not equal to zero, a further cycle of row and column runs is carried out in the same sequence, as is illustrated in FIGS. 4-5 to 4-8. By way of example, the origin of the interpolation value "80.0" in the grid field in column 1 and row 7 of the grid during the column-by-column run from top to bottom as shown in FIG. 4-7 will now be explained. In the previous run (FIG. 4-6), this grid field was filled with the extrapolation value "70" and the associated distance figure "2". On the basis of the above statements, an interpolation is now carried out during the run as shown in FIG. 4-7 between the interpolation value $H_1=85.0$ with the distance figure "0" and the directly subsequent extrapolation value $H_2=70$ in the direction of the run with the distance figure $D_2=2$. From equation (1), this results in:

$$H_i = 85 + \frac{70-85}{0+2+1} \cdot (0+1) = 80.$$

The extrapolation value $H_2=70$ is now overwritten with this new interpolation value $H_i=80$ thus resulting in the grid field with the new interpolation value "8", shaded in FIG. 4-7.

Since some of the grid fields are still occupied by extrapolation values after completion of the run cycle in the grid as shown in FIG. 4-8, this is followed by a further run cycle with the runs as shown in FIG. 4-9 to FIG. 4-12, a further run cycle as shown in FIG. 4-13 to FIG. 4-16, once again by a run cycle with the runs as shown in FIG. 4-17 to FIG. 4-20, and by a final run cycle with the runs as shown in FIG. 4-21 to FIG. 4-24. Since shaded grid fields which are not present in FIGS. 4-14, 4-15, 4-18, 4-19, 4-21, 4-22 and 4-23 can still be seen, no interpolation values result on the basis of the interpolation rule from the runs shown in these figures. In the last run shown in FIG. 4-24, it can be seen that all of the grid fields (with the exception of the grid fields with support values and fault lines that had been excluded, of course) are filled with interpolation values and there are no more extrapolation values that need to be subjected to interpolation. The five grid fields with the extrapolation values "90" which can still be seen in the top left-hand corner of FIG. 4-24 remain, since these extrapolation values are not adjacent to height values whose height difference is not equal to zero, so that no interpolation process is carried out, in accordance with the interpolation rule as described above.

As already mentioned initially, grid fields with which discontinuities or fault lines are associated (with black outlines in the grid) are excluded from the extrapolation and weighted linear interpolation processes. Since support values with fault line characteristics without any height details generally have a height value which corresponds to the terrain, for example a riverbank which represents a fault line, the grid fields with fault line characteristics but without any height indication are filled with an extrapolation value by means of a subsequent extrapolation process. This process is sketched in the grid in FIG. 5. Since, after completion of the last run cycle with a column-by-column run as shown in FIG. 4-24 from bottom to top, the next run cycle starts with a row-by-row run from left to right, the extrapolation values which are written into the empty grid fields with fault line characteristics are now derived from the preceding height values in the direction of the run, which are interpolation values in this case. These extrapolation values are once again allocated a distance figure, which now indicates the proximity of the extrapolation value to the height value from which the extrapolation value is derived. Since, in the chosen exemplary embodiment, only grid fields which are directly adjacent to one another in the column direction have fault line characteristics, all of the grid fields with fault line characteristics are filled with an extrapolation value during this single run, so that no more runs are carried out. If further grid fields in a column were still filled with fault lines without height details in the row direction, then these grid fields would likewise be filled with an extrapolation value with a distance figure during the next run from left to right. If these have a height difference from the previously created extrapolation values that is not equal to zero then an interpolation process is carried out in the manner described above between the extrapolation values.

Finally, a check is carried out to determine whether there are still any remaining grid fields that are still unoccupied and are adjacent to the grid fields with a fault line characteristic. If this is the case, then these grid fields are filled with an extrapolation value which is derived in the described manner from the immediately preceding extrapolation value in the direction of the run in the grid field with fault line characteristics.

In the terrain model which is represented by the grid as shown in FIG. 5, each grid point with a predetermined height (support values and discontinuities with a height indication) are filled with an interpolated height or an extrapolated height. This terrain model can be evaluated or represented three-dimensionally using known methods.

The invention claimed is:

1. A method for generation of a three-dimensional terrain model with the assistance of object-oriented vector data comprising: providing object-oriented data which contains position values which indicate at least the cartographic position of support points which describe the terrain and height values which indicate their height or depth with respect to a reference level writing the height values of the support points to grid fields of a regular grid as support values associated with the cartographic position of the support points; carrying out extrapolation in the grid by running through the grid in rows and columns, grid field by grid field and, in the first run, writing each support value which is stored in a grid field as an extrapolation value to an unoccupied grid field which is adjacent in the direction of the run, and, in all the other runs, writing each support value which is stored in a grid field and each extrapolation value derived therefrom to an unoccupied grid field which is adjacent in the direction of the run; allocating to all the extrapolation values a distance figure which indicates the proximity of the extrapolation value to its support value; repeating the runs until all of the grid fields are occupied; and, subjecting derived extrapolation values to weighted interpolation in the grid.

2. The method as claimed in claim 1, further comprising indicating the distance figure of an extrapolation value by "1" when the extrapolation value is derived directly from the support value, and increasing the distance figure by "1" for each extrapolation value derived from an extrapolation value.

3. The method as claimed in claim 1, including, for interpolation, running through the grid in rows and columns, grid field by grid field, and carrying out weighted interpolation, using the distance figures of the extrapolation values for weighting the interpolation, in each case between two height values which are immediately adjacent to one another in the direction of the run, have a height difference not equal to zero and of which at least the height value which follows in the direction of the run is an extrapolation value, and overwriting the latter with the interpolation value, and repeating the runs until there are no more extrapolation values which are adjacent to a height value with a height difference not equal to zero.

4. The method as claimed in claim 3, including calculating the interpolation value $H_i$ using:

$$H_i = H_1 + \frac{H_2 - H_1}{D_1 + D_2 + 1} \cdot (D_1 + 1), \quad (1)$$

where $H_1$ is the first height value in the direction of the run and $D_1$ is its distance figure, and $H_2$ is the following height value as an extrapolation value in the direction of the run and $D_2$ is its distance figure, and each height value which is a support value or an interpolation value is assigned the distance figure "0".

5. The method as claimed in claim 1, wherein including during the runs, cutting out those grid fields which are occupied with support points having fault line characteristics, and, after completion of the interpolation, carrying out an extrapolation and possibly a weighted interpolation with respect to those grid fields which are occupied by support points which have fault line characteristics but are without height values.

6. The method as claimed claim 1, including initially carrying out each run row-by-row through the grid from left to right and then from right to left, or vice versa, and first carrying out each run through the entire grid column-by-column from top to bottom and then from bottom to top, or vice versa.

7. The method as claimed in claim 6, wherein a run cycle is defined by a sequence of two runs row-by-row and two runs column-by-column and further including leaving the sequence unchanged in successive run cycles.

8. The method as claimed in claim 3, including indicating the distance figure of an extrapolation value by "1" when the extrapolation value is derived directly from the support value, and increasing the distance figure by "1" for each extrapolation value derived from an extrapolation value.

9. The method as claimed in claim 8, including calculating the interpolation value $H_i$ using:

$$H_i = H_1 + \frac{H_2 - H_1}{D_1 + D_2 + 1} \cdot (D_1 + 1), \quad (1)$$

where $H_1$ is the first height value in the direction of the run and $D_1$ is its distance figure, and $H_2$ is the following height value as an extrapolation value in the direction of the run and $D_2$ is its distance figure, and each height value which is a support value or an interpolation value is assigned the distance figure "0".

10. The method as claimed in claim 3, including during the runs, cutting out those grid fields which are occupied with support points having fault line characteristics, and, after completion of the interpolation, carrying out an extrapolation and possibly a weighted interpolation with respect to those grid fields which are occupied by support points which have fault line characteristics but are without height values.

11. The method as claimed claim 3, including initially carrying out each run row-by-row through the grid from left to right and then from right to left, or vice versa, and first carrying out each run through the entire grid column-by-column from top to bottom and then from bottom to top, or vice versa.

12. The method as claimed in claim 11, wherein a run cycle is defined by a sequence of two runs row-by-row and two runs column-by-column and further including leaving the sequence unchanged in successive run cycles.

\* \* \* \* \*